3,614,807
APPARATUS FOR FORMING HOLLOW BODIES
Serge Lagoutte, Chalon-sur-Saone, France, assignor to Societe d'Etudes Verrieres Appliquees, Neuilly-sur-Seine, Hauts-de-Seine, France
Filed June 13, 1969, Ser. No. 832,916
Claims priority, application France, June 17, 1968, 155,192
Int. Cl. B29c 17/07
U.S. Cl. 18—5 BE                           1 Claim

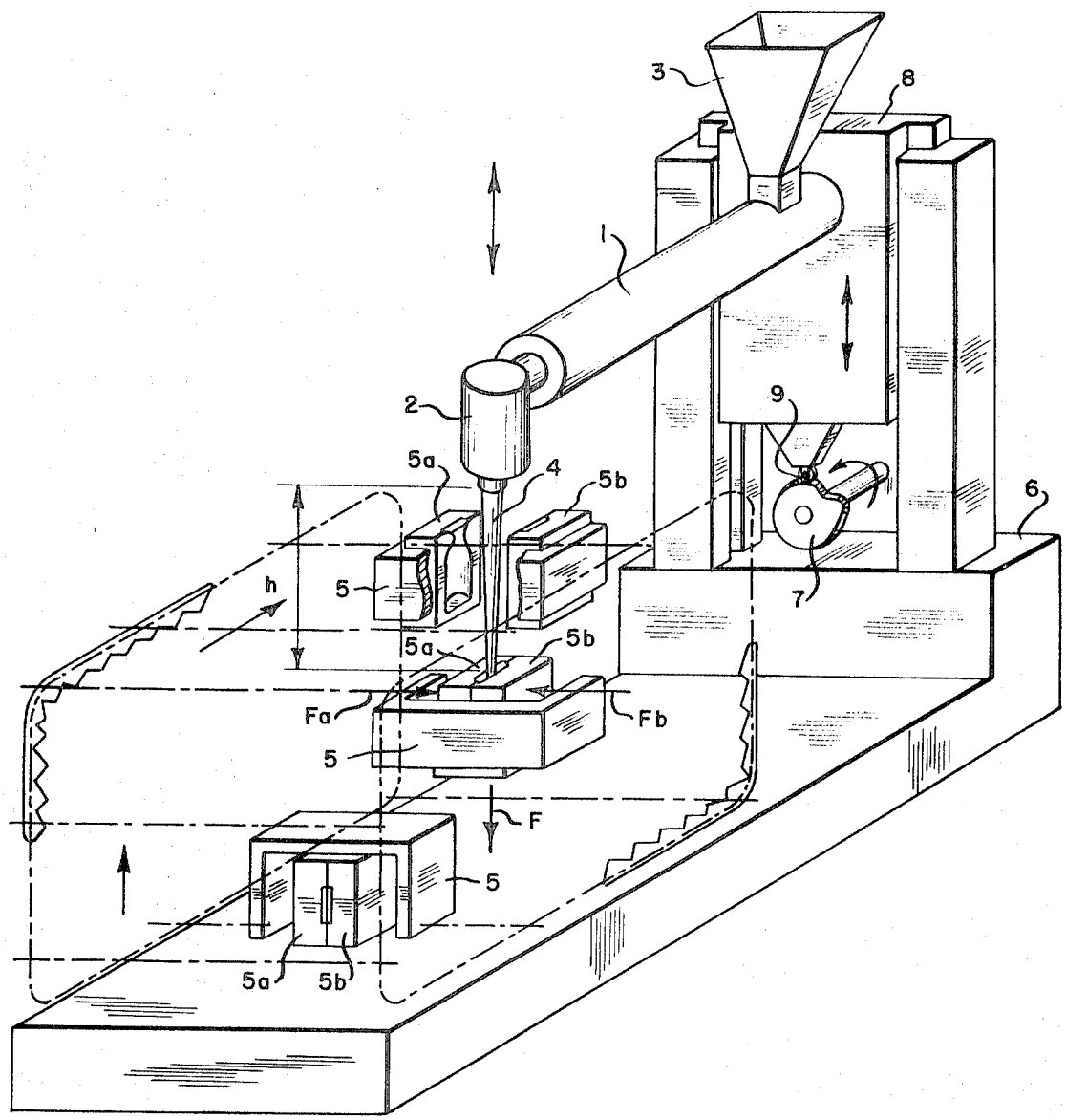

ABSTRACT OF THE DISCLOSURE

Hollow bodies such as bottles are blow molded from tubular plastic material produced along an axis defined in an extruder therfor by means of molds carried through a closed path, part of which coincides with that axis. As each mold is carried to the position where it intersects the axis of the extruder, it closes on a section of the plastic material to permit blowing thereof to the shape defined by the mold, and the mold moreover continues to move along that axis, pulling on the material between it and the extruder. In order to impart to the section of extruded material between that mold and the extruder (which section will be seized by the next mold) a desired variation in wall thickness, a supplementary cyclical relative motion is imparted to the extruder and to the mold pulling on the extruded material, for example by means of a cam which shifts the extruder along the extrusion axis with respect to the apparatus which carries the molds.

---

The present invention pertains to the formation of hollow bodies by blowing from tubular gobs or blanks of material brought to a plastic state.

The invention pertains, more particularly, to the continuous formation of hollow bodies of thermoplastic material by blowing of tubular blanks in a succession of molds, the tubular material being supplied, for example, by extrusion.

More particularly still, the invention pertains to a known apparatus in which the open mold seizes the blank by closing thereon and then pulls on the blank substantially along the direction of formation thereof which, in the case of extruded tubular material, may be the direction along which extrusion takes place.

In this known apparatus the tubular material is thus held between its point of origin, at the orifice of the extruder or equivalent device, and the mold which has closed thereon. The mold thus performs a stretching function, accurately positioning the tubular material in a stretched condition between two points.

The coincidence between the direction of motion of the mold thus pulling on the tubular material and the axis of the extruder makes it possible to stretch that material (including the portion thereof which will be enclosed as a blank in the next arriving mold and be blown therein), by choosing for the extrusion a speed lower than that at which the molds closing on the material are displaced. Since this stretching is applied to the end of the material held by the mold during the continued extrusion of the mold material, the stretching is applied for a longer time to that portion of the material close to the mold which is pulling on it than to the portion of the material adjacent the extruder. The result is that the tubular material will have walls of non-uniform thickness, the thickness being less at the end about which the next mold closes than the end adjacent the extruder. This fact is often taken advantage of in blow molding machines by so positioning the mold that the neck of the hollow article to be blown, and which undergoes a smaller enlargement in the blowing operation, is formed at the downstream end of the tubular blank where the walls thereof are of smaller thickness. The sidewalls and the bottom of the vessel to be blown, which during the blowing operation undergo expansion to a larger diameter than the neck, are therefore formed in those parts of the blank having greater wall thickness.

While this mode of operation is satisfactory for the formation of certain types of bottles or the like, it is not ideal in all cases. Thus if it is desired to blow a vessel of non-cylindrical shape whose greatest transverse section is at the mid-height thereof and whose bottom is hardly larger in diameter than its neck, it is desirable to enclose within the mold a tubular blank whose wall thickness is minimum at the ends and maximum at the middle. Similarly it would be desirable, for the formation of vessels with a particularly strong neck, to enclose within the mold prior to blowing a blank having at the portion thereof from which the neck is to be formed a wall thickness as great as at the portion thereof from which the bottom is to be formed.

It is an object of the invention to provide machinery for the blowing of hollow vessels or bodies, making it possible to give to the walls of the blanks from which the vessels are to be blown at every position along the height or length thereof the thickness which is optimum in view of the shape of the vessel to be blown.

Hereinafter the term "critical point" will be applied to that point along the path of motion of the molds where they close successively on the material to be blown and thereby assume the function of "pulling molds." In practice this point is often marked by the presence of cams or inclined planes which serve to cause the mold halves to approach each other, so that the molds always close at an accurately defined location upon the material to be blown.

In the blow molding machines heretofore known to me, the extruding head or equivalent element from which the material to be blown is delivered is disposed at a fixed distance from the critical point as hereinabove defined.

In accordance with the invention, the critical point and extruding head or equivalent are made axially movable one with respect to the other with a reciprocating relative motion so disposed in direction and speed, in the location of the end points of that motion, and in the times of passage of the critical point and extruding head through the end points of that motion by reference to the motion of the pulling mold, as to achieve for the walls of the blank the thickness variation desired.

This relative motion between the extruding head or equivalent point of origin of the tubular mold material and the critical point may be obtained in accordance with the invention by displacement of the critical point, or of the extruding head or equivalent, or by motion simultaneously in whole or in part of both. The supplementary motion thus provided by the invention combines with the motion of the mold itself.

Thus for example when the pulling mold, i.e. the mold which has already closed on the material, moves at constant velocity, it is possible by control of the motion applied to the extruding head or equivalent to control within limits the wall thickness of any desired part of the material extending between the extruder and that pulling mold before the next arriving mold closes on that length of material. It is thus possible to obtain mold blanks whose wall thickness is either uniform or non-uniform in accordance with a predetermined desired variation along the length of the mold.

In machines in which the motion of the molds through that portion of their path wherein they pull on the material being extruded is non-uniform, the invention makes it possible to obtain either a uniform (and optionally a zero) stretching, or to obtain either a reduction or an increase in the wall thickness of the mold blank at any desired point along the length thereof.

The description of a preferred embodiment of the invention presently to be given pertains to an embodiment having the following properties:

(a) The gobs or tubular blanks of material to be blow molded may be formed on presently available types of extruding machines;

(b) The material is extruded vertically downward;

(c) The reciprocating motion which characterizes the invention is applied to the extruded alone, the frame for the mold carrier being stationary; and (d) The vertical motion of the extruder is produced by a cam.

Given, in such an embodiment, the motion imposed on the molds by the carrier therefor and given also the variation in wall thickness desired to be imparted to the mold blanks, the man skilled in the art can readily determine the nature of the motion to be given to the extruder in accordance with the invention, and hence the exact cam shape desired.

The invention will now be further described in terms of a presently preferred non-limitative exemplary embodiment and with reference to the accompanying drawing, wherein the single figure of drawing is a diagrammatic perspective view of a molding machine according to the invention.

In the drawing, reference character 1 identifies an extruded having a perpendicularly disposed extruding head 2. The extruder is fed at a hopper 3 and delivers from the head 4, vertically downwardly, a continuous tubular blank of plastic material in a heated and softened condition. In the drawing the tubular blank is shown as being pinched or seized by a mold 5 at a height $h$ below the extruder where the two halves 5a and 5b of the mold have closed on the tubular blank by motions in the directions F$a$ and F$b$ respectively. The critical point is hence at a distance $h$ below the head 2. The mold 5 is one of a plurality of identical molds of which two others 5' and 5" are shown, the molds being supported for motion through a closed path on a carrier whose frame is fixed with reference to the frame 6 of the extruder.

The mold carrier has not been shown in the drawing and need not be described in detail, since it may be of known type. It may for example be of the character disclosed in my copending application Ser. No. 774,385, filed Nov. 8, 1968, and assigned to the assignee hereof. In the case of a vertical extrusion such as shown, the mold carrier imparts to each mold upon reaching the critical point where it closes on the tubular blank a vertically downward motion along the axis of the blank indicated in the drawing by the arrow F.

Under these conditions, and absent the vertical motion of extruder 1 in accordance with the invention presently to be described, the section of plastic material 4 between the upper limit of this mold and the extruder head 2, which section will after descending be subsequently seized by the next mold 5', will first be stretched by the mold 5, prior to such seizure. The amount of this stretching (which may be zero) will depend on the excess, if any, of the speed of descent of the mold 5 along the direction F over the extrusion speed, on the assumption that the extruder is fixed with reference to the base 6 as is the case with the machines of the prior art known to me.

If it is desired, in accordance with the invention, to control this stretching, either to eliminate it or to give to it various values in accordance with various values desired to be given to the wall thickness of the blank, and assuming the vertical motion of the mold to be known, then it is necessary to impart to the extruder a correcting vertical motion.

Assuming the material 4 to be extruded at constant speed as is usual, and assuming moreover that the molds move vertically in the extrusion axis at constant speed, it will be apparent that if it is desired to give to the material prior to blowing a variation in wall thickness along the length thereof, the invention may be carried out by giving to the extruder a reciprocating vertical motion properly selected in view of the extrusion speed and the vertical speed of the molds.

In another embodiment of the invention wherin the mold matrial is extruded at a constant speed but in which the molds descend with a non-constant speed, for example one including an initial acceleration and a subsequent retardation due to the nature of the blowing apparatus, if it is desired to avoid all stretching and subsequent relaxation of the mold blank, there is imposed on the extruder a compensating movement which is vertical and of a reciprocating nature and whose exact equation can be readily determined.

In this computation the differential stretching and compensation effects described in the next two preceding paragraphs may be combined.

The result is to impose on the extruder a vertical reciprocating motion according to a specified function of time. This motion may be produced by suitable means, such as the cam 7 rotating about a horizontal axis. A slide 8 to which the extruder is attached rests on the cam through the intermediary of a roller 9. The cam profile can be determined as a function of the motion desired to be imparted to the extruder but the reciprocating motion of the extruder must be accurately synchronized with the cyclical passage of the molds. Such synchronization may advantageously be obtained by using the same shaft for driving the mold carrier and the cam 7, with positive drive elements or linkages such as gears or chains between such shaft on the one hand and the mold carrier and the cam on the other hand. The design of such linkages is a matter of mechanics within th skill of a mechanic and need not be set forth here. Other means may be employed to achieve the desired relative motion between the molds and the extruder which is the object of the invention. Thus the mechanical reciprocating mechanism which has been described may be replaced with a hydraulic mechanism so as to reduce the stress on the motion-defining cam. Moreover, change of the cam makes it possible to change the relative motions as may be desired in the course of operations.

I claim:

1. Apparatus for blow molding hollow articles from tubular plastic material, said apparatus comprising a base, a plurality of molds, means supported on said base to carry said molds cyclically through a closed path fixed with respect to said base, said path including a straight portion, guide means on said base defining a path of motion parallel to said straight portion, an extruder supported on said guide means ot deliver a tube of plastic material substantially collinearly with said straight portion, and cam driven means to recpirocate said extruder along said guide ways, whereby said carrying means and extruder undergo cyclical translational motion relative to each other.

References Cited

UNITED STATES PATENTS

| | | | |
|---|---|---|---|
| 2,750,625 | 6/1956 | Colombo | 18—5 |
| 2,952,034 | 9/1960 | Fortner | 264—99 |
| 2,964,795 | 12/1960 | Schaich | 264—NUWT |
| 3,264,383 | 8/1966 | Niessner et al. | 264—209 X |
| 3,449,481 | 6/1969 | Tahara | 264—99 |

ROBERT F. WHITE, Primary Examiner

T. J. CARVIS, Assistant Examiner

U.S. Cl. X.R.

264—99; 18—5 BP, 5 BV